Figure 1:
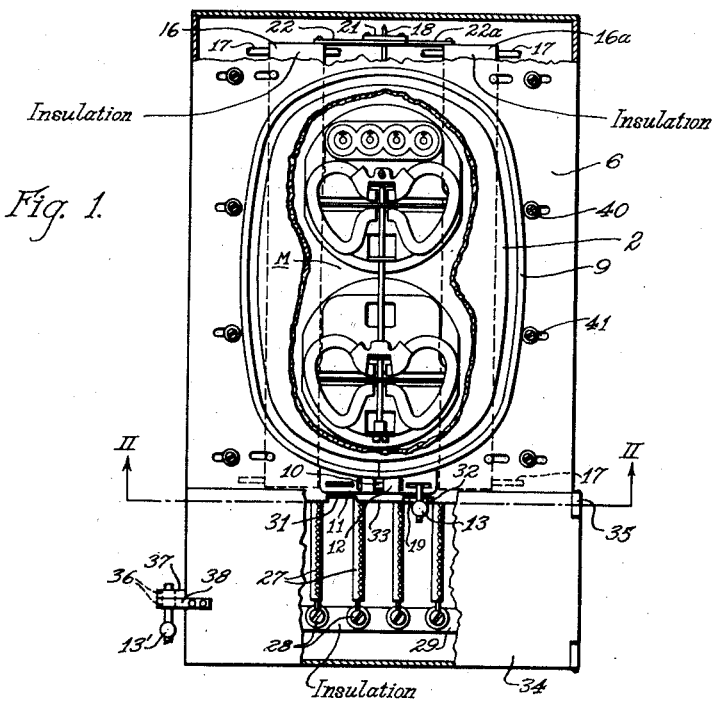

Feb. 11, 1941.  A. R. RUTTER  2,231,737

DETACHABLE INSTRUMENT

Filed March 21, 1939

WITNESSES:

INVENTOR
Argyle R. Rutter.
BY
ATTORNEY

Patented Feb. 11, 1941

2,231,737

UNITED STATES PATENT OFFICE 2,231,737

DETACHABLE INSTRUMENT

Argyle R. Rutter, Chatham, N. J., assignor to Westinghouse Electric & Manufacturing Company, East Pittsburgh, Pa., a corporation of Pennsylvania Application March 21, 1939, Serial No. 263,149

11 Claims. (Cl. 175—222)

This invention relates to detachable instruments and it has particular relation to improved socket constructions for receiving and testing such instruments.

Detachable instruments of the type disclosed in the Bradshaw et al. Patent 1,969,499 and the Allen et al. Patent 2,076,491, both assigned to the Westinghouse Electric & Manufacturing Company, have become standard not only in the field of watthour meters but also in other fields, such as dynamometer, D'Arsonval and moving iron instruments. Because of the high contact pressures employed for establishing electrical contact between the contact blades carried by the detachable instrument and the contact jaws provided in the instrument socket, considerable force must be exerted for attaching the instruments to their sockets and for removing the instruments therefrom. This is particularly pronounced in the case of instruments having large numbers of contacts. For example, a polyphase watthour meter may have a total of 15 contacts and consequently would require an unusually high force for attaching it to its socket. Other detachable instruments, such as relays, may require an even larger number of contacts, with consequent increase in the force required for installation and removal.

Another problem presented by detachable instruments is that of testing. In certain instruments, such as single-phase watthour meters, the testing problem is not acute for the reason that such instruments are tested infrequently at intervals of several years. Moreover, because of the flexibility of the detachable construction, it is possible to remove single-phase watthour meters and similar instruments for testing at a central test laboratory. For other instrument installations, however, it is economically desirable to test the instrument more frequently. As an example of such an instrument installation, reference may be made to the large polyphase watthour meter which ordinarily is employed for measuring large values of energy. Because of the large values of energy measured, it is important to maintain the accuracy of the meter at an extremely high level. For this reason, it is the practice to run tests on such a meter at frequent intervals. Partially for this reason, it is desirable to test such a meter in its installed position.

In accordance with this invention, sockets for detachable instruments are so designed that the pressure exerted by the socket contacts upon the contacts carried by the detachable instrument may be relieved prior to attachment of the instrument to its socket or prior to removal of the instrument therefrom. In a specific embodiment of my invention, the socket contacts are mounted on a movable carriage which may be moved from contact engaging position to a position in which substantially no pressure is exerted by the socket contacts upon the contacts carried by the instrument. This movable carriage also may be employed for carrying test contacts against the contacts of the detachable instrument. Since it may not be desirable to interrupt the continuity of service during the test of a detachable instrument, this invention also provides for by-passing the instrument whenever it becomes necessary to remove the instrument from its socket or to test the instrument. This may be accomplished by positioning by-passing contacts to engage the socket contacts as they are moved away from the detachable instrument contacts.

It is, therefore, an object of this invention to provide an improved socket for detachable instruments which facilitates attachment and removal of the instruments.

It is another object of my invention to relieve the pressure exerted by the contacts of a detachable instrument against the contacts carried by its socket prior to removal or attachment of an instrument.

It is another object of my invention to provide a detachable instrument with means for simultaneously relieving contact pressure therein and completing a by-pass around the instrument.

It is a further object of my invention to provide a detachable instrument with means for simultaneously relieving pressure between its contacts and the contacts of its socket, and establishing a test circuit for the detachable instrument.

It is a still further object of my invention to mount the contacts in the socket of a detachable instrument for movement.

It is a still further object of my invention to provide a detachable instrument with a socket having movable contacts actuated by control means which are protected from unauthorized actuation by the same seal employed for protecting the detachable instrument.

Figure 2:
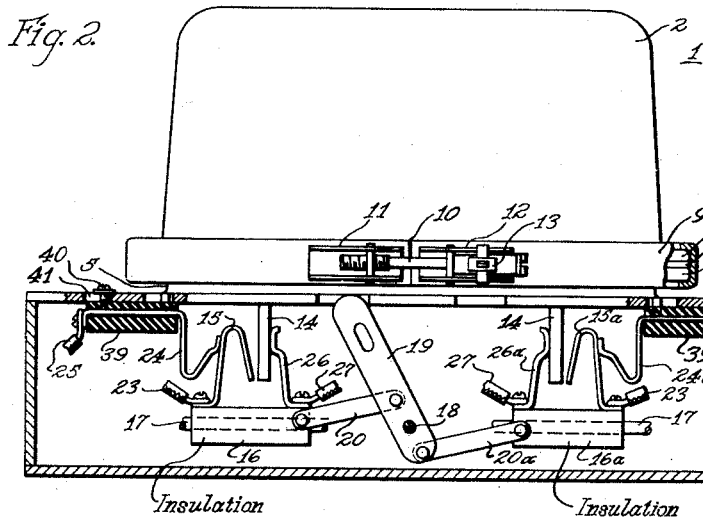
Figure 3:
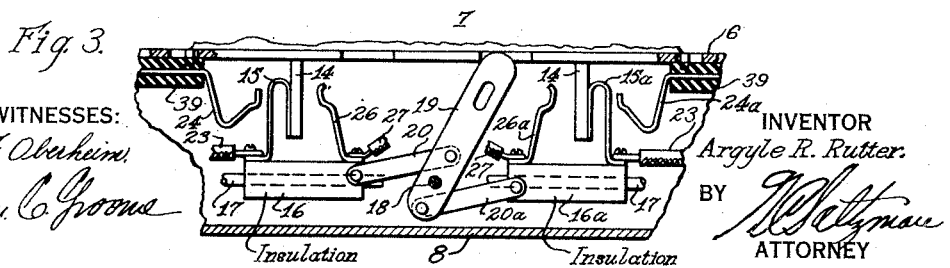

Other objects of my invention will be apparent from the following description taken in conjunction with the accompanying drawing, in which Figure 1 is a view in front elevation with parts broken away of a detachable instrument installation embodying my invention;

Fig. 2 is a view in cross section, with parts broken away, taken along the lines II—II of Fig. 1; and Fig. 3 is a view in cross section corresponding to Fig. 2, but with the parts thereof in different positions.

Referring to the drawing, I have illustrated a conventional detachable instrument 1 comprising a glass cover 2 and a meter mechanism M which is illustrated as a polyphase watthour meter unit. The instrument and cover are provided with flanges 3, 3' which in normal operation are positioned adjacent a flange 4 carried by a ring 5 attached to the cover 6 of a socket structure 7. The socket structure may take any of the numerous forms available in the prior art, but, as illustrated, the socket structure is mounted in a box type housing 8. Instead of the box type housing, this socket may be mounted on a switchboard, in which case the cover 6 would correspond to the face of the switchboard, or the socket may be mounted in a trough type housing. As is conventional in detachable meter construction, the detachable instrument is retained on its socket by means of a sealing ring 9 which is clamped in sealing position around the flanges 3 and 4 by means of a bolt 10 which engages clips 11 and 12 affixed to the ends of the sealing ring. Unauthorized removal of the sealing ring is prevented by means of a seal 13 which passes through slots in one of the clips 12 and in the bolt 10. Electrical connections to the detachable instrument are made by means of contact blades 14 which project from the base of the detachable instrument through the ring 5 when the instrument is in attached position. Further details of the construction of the detachable instrument thus far described are disclosed in the aforesaid patents to Bradshaw et al. and Allen et al.

For energizing the detachable instrument, the socket structure 7 is provided with a number of contact elements 15 and 15a which preferably are constructed of spring material, such as brass. These contacts are shown in their normal operating positions in Fig. 3. As is apparent from a study of this figure, considerable pressure is exerted between the contact blades 14 of the instrument and the contact elements 15 and 15a of the socket. In order to relieve this pressure prior to insertion or removal of the detachable instrument, the contact elements 15 and 15a are mounted for movement towards and from the contact blades 14. Such movement may be provided by mounting the contact elements upon suitable carriage blocks 16 and 16a which are constructed from insulations or otherwise insulate the contact elements from each other.

These carriage blocks 16, 16a may be mounted for movement in a number of different ways. As illustrated, the carriage blocks are provided with elongated openings for slidably receiving a plurality of rods 17 which are fixed to the box 8 in any suitable manner. By sliding the carriage block 16 upon the rods 17 from the positions shown in Fig. 3 to those illustrated in Fig. 2, the contact elements 15 and 15a are moved away from the contact blades 14, thereby relieving the pressure therebetween. For effecting this movement conveniently, a shaft 18 is mounted for rotation in the box 8 and carries attached thereto a lever 19. A pair of links 20 and 20a connect the lever 19 respectively to the carriage blocks 16 and 16a for converting rotation of the lever 19 into reciprocation of the carriage blocks. Additional levers 21 and links 22 and 22a (Fig. 1) are provided for distributing the forces exerted by movement of the lever 19 over the carriage blocks 16 and 16a. It will be noted that the carriage blocks have a considerable length. Although only one contact element 15 or 15a is shown on each block, it should be understood that in practice a number of similar contact elements will be distributed along the length of each of the carriage blocks for cooperation with a plurality of contact blades carried by the detachable instrument. The contact elements 15 and 15a are connected to the line and load sides of a circuit to be metered by means of suitable conductors 23.

Since it may be undesirable to interrupt the circuit when the detachable instrument is removed from its socket, I provide a plurality of circuit closing contacts 24 and 24a in the path of movement of the contact elements 15 and 15a, respectively. From an inspection of Figs. 2 and 3, it will be noted that as the contact elements 15 and 15a are moved away from the contact blades 14, they engage the circuit completing contacts 24 and 24a which are connected by means of suitable conductors 25 for by-passing current around the detachable instrument. The contact elements 15 and 15a and the associated contacts preferably are so proportioned that the contact elements 15 and 15a make contact with the circuit closing contacts 24 and 24a before breaking contact with the contact blades 14.

In order to test the detachable instrument while mounted on its socket, a plurality of test contacts 26 and 26a are mounted on the movable carriage blocks 16 and 16a, respectively. As the contact elements 15 and 15a are moved away from the contact blades 14 the test contacts 26 and 26a are moved into contact with the contact blades 14. Suitable test contacts may be designed to exert relatively low pressures on the contact blades. These test contacts are connected by means of suitable conductors 27 to a plurality of test terminals 28 which may be mounted on a strip of insulation 29 at one end of the box 8. The terminals 28 may be of any suitable design such as, for example, that illustrated in the Mylius Patent No. 2,088,481, which is assigned to the Westinghouse Electric & Manufacturing Company.

It is believed that the operation of the apparatus thus far described is apparent. If it is desired to replace an instrument mounted on its socket, the lever 19 may be moved from the position illustrated in Fig. 3 to that illustrated in Fig. 2. Such movement of the lever 19 forces the contact elements 15 and 15a away from the contact blades 14 thereby relieving the detachable instrument from undue pressure. At the same time, the contact elements 15 and 15a engage the circuit closing contacts 24 and 24a for maintaining continuity of service during the exchange of instruments. With the contacts in these positions, the detachable instrument may be removed easily from its socket and replaced by a new instrument. The test contacts are provided with curved entrance lips which guide the test contacts along the contact blades 14 of the new instrument. After the new instrument has been mounted in position, the lever 19 may be returned to the position shown in Fig. 3, bringing the contact elements 15 and 15a into contact with the contact blades 14 of the new instrument. The detachable assembly then is ready for continued operation.

If it is desired to test an instrument mounted on a socket structure 7, the lever 19 is moved from the position shown in Fig. 3 to the position shown in Fig. 2 in order to move the contact elements 15 and 15a away from the contact blades 14 into contact with the circuit closing contacts 24 and 24a thereby assuring continuity of service during the test period. At the same time, the movement of the lever 19 acting through the carriage blocks 16 and 16a carries the test contacts 26 and 26a into contact with the contact blades 14. Suitable connections having been made between the test terminals 28 and the testing apparatus, the detachable instrument 1 may be conveniently tested. At the close of the test the lever 19 is restored to the position shown in Fig. 3 in order to restore the detachable instrument to service, and the test apparatus is disconnected from the test terminals 28, if desired.

Occasionally it may be desirable to disconnect the line and load sides of the circuit served by the detachable instrument 1. This may be accomplished readily by moving the circuit closing contacts 24 and 24a out of the path of movement of the contact elements 15 and 15a. As illustrated, the circuit closing contacts 24 and 24a are mounted on insulating blocks 39, which are attached to the cover 6 by means of machine screws 40. In order to provide such movement for the insulation blocks 39, the screws 40 are passed through slots 41 in the cover. By loosening the screws 40 and moving the circuit closing contacts 24 and 24a away from the contact elements 15 and 15a, assuming that the meter parts otherwise are in the position illustrated in Fig. 2, the detachable instrument 1 is removed from service and the line and load sides of the meter circuit are disconnected.

Unwarranted operation of the lever 19 may be prevented in many different ways. As illustrated in Fig. 1, the lever 19 moves between two recesses 31 and 32 provided in the cover 6. The lever 19 is sprung slightly to pass the projection 33 between the two recesses, and the projection retains the lever in either of its extreme positions. Under normal conditions, the lever and the test terminals 28 are protected by means of an auxiliary cover 34 which is mounted on a hinge 35 provided at one side of the box 8. This cover not only extends over the terminals and lever but projects beneath the sealing ring clips 11 and 12. Consequently, the auxiliary cover 34 cannot be opened until the seal 13 is broken and the sealing ring 9 is removed. If desired, a separate sealing means may be employed for the auxiliary cover as by passing a seal 13' through openings 36 provided in a pair of lugs 37 and 38 mounted respectively on the box 8 and the auxiliary cover 34.

For switchboard operation, these precautions are, of course, unnecessary as a rule. Consequently, the lever 19 may project slightly through an opening in the switchboard corresponding to the cover 6 and may remain accessible at all times.

Although I have described my invention with reference to certain specific embodiments thereof, it is obvious that numerous modifications are possible. For example, if it is unnecessary to provide test facilities for an instrument, the test contacts 26 and 26a with their connections need not be employed. Similarly, if circuit continuity is not required at all times, the circuit closing contacts 24 and 24a, together with their connections, need not be employed. Because of these and other permissible modifications, I do not wish my invention to be restricted except as required by the appended claims when interpreted in view of the prior art.

I claim as my invention:

1. In a detachable instrument assembly, an instrument, a contact member on said instrument, a base for detachably receiving said instrument in a predetermined position, a first contact element on said base, a second contact element on said base, and means for selectively establishing contact between either of said contact elements and said contact member while said instrument is in said predetermined position.

2. In a detachable instrument assembly, an instrument, a contact member on said instrument, a base for detachably receiving said instrument in a predetermined position, a first contact element on said base, a second contact element on said base, and means for selectively moving said second contact element into engagement with either said first contact element or said contact member while said instrument is in said predetermined position.

3. In a detachable instrument assembly, an instrument, a base for detachably receiving said instrument, a first contact member on said instrument, a second contact member on said base, a pair of movable contact elements on said base, and means for selectively moving said contact elements from positions in which each engages one of said contact members to positions in which a first one of said contact elements is disengaged and a second one of said contact elements engages a different one of said contact members.

4. In a base for a detachable instrument having a contact member, a first contact element on said base, and a second contact element on said base, said second contact element being movable from a position in contact with said contact member to a position in contact with said first contact element, and said first contact element being movable out of the path of movement of said second contact element.

5. In a detachable instrument assembly for an electrical circuit, an electrical instrument, a base for detachably receiving said instrument, contact means on said instrument for connecting said instrument to said circuit, circuit completing means for replacing an electrical path represented by said instrument, and means for selectively engaging either said contact means or said circuit completing means for completing said electrical circuit.

6. In a detachable instrument assembly, an instrument, contact making means for said instrument, a base for detachably receiving said instrument, contact completing means movable on said base into and out of operative relation with respect to said contact making means, control means for moving said contact completing means while said instrument is in operative position, and common means for sealing said instrument against detachment and against actuation of said control means.

7. In a detachable instrument assembly, an instrument, contact making means for said instrument comprising contact blades carried by said instrument, a base for detachably receiving said instrument, said instrument and contact blades being removable as a unit from said base, contact completing means movable on said base into and out of operative relation with respect to said contact making means, control means for moving said contact completing means, test means having connections controlled by said control means, and a common enclosure for said control means and test means, said control means being accessible with said instrument in operative position.

8. In an instrument assembly, a detachable electrical instrument having first contact means comprising contact blades removable with said instrument from said base, a base for detachably receiving said electrical instrument, second contact means carried by said base for resiliently engaging said first contact means, and control means operable while said electrical instrument is mounted in its operative position on said base for moving said first and second contact means into and out of electroconductive engagement with each other.

9. In a detachable instrument assembly, an electrical instrument having first contact means, a base for supporting said electrical instrument, said electrical instrument and first contact means being removable as a unit from said base, second contact means carried by said base for engaging said first contact means, said base and said instrument when mounted on said base cooperating to form an enclosure for said contact means, and control means operable while said electrical instrument is mounted on said base for moving said first and second contact means into and out of electroconductive engagement with each other.

10. In a detachable instrument assembly, a detachable electrical instrument having a plurality of contact blades, a base for detachably supporting said electrical instrument, said base and electrical instrument cooperating to form an enclosure for said contact blades when said electrical instrument is in mounted position on said base, a plurality of contact elements carried by said base in said enclosure for electroconductively engaging said contact blades, and means having a common control member for positively actuating said contact elements and said contact blades towards a condition wherein said contact elements and contact blades are disengaged while said electrical instrument is in its mounted position.

11. In a detachable instrument assembly, a detachable electrical instrument having a plurality of main contact members, a base for detachably supporting said electrical instrument, said base and electrical instrument cooperating to form an enclosure for said main contact members when said electrical instrument is in mounted position on said base, a plurality of contact elements carried by said base in said enclosure for electroconductively engaging said main contact members, a plurality of auxiliary contact members, and means having a common control member for actuating said contact elements from engagement with one group of said contact members into engagement with the remainder of said contact members while said electrical instrument is in its mounted position.

ARGYLE R. RUTTER.